United States Patent
Corral et al.

(10) Patent No.: US 9,296,190 B1
(45) Date of Patent: Mar. 29, 2016

(54) COMPOSITE MATERIALS AND METHODS FOR THEIR PRODUCTION

(75) Inventors: Erica L. Corral, Tucson, AZ (US); William R. Pinc, Tucson, AZ (US); Luke S. Walker, Tucson, AZ (US); Zachary Wing, Tucson, AZ (US)

(73) Assignee: Arizona Board of Regents on Behalf of The University of Arizona, Tucson, AZ (US)

( * ) Notice: Subject to any disclaimer, the term of this patent is extended or adjusted under 35 U.S.C. 154(b) by 726 days.

(21) Appl. No.: 13/464,623

(22) Filed: May 4, 2012

Related U.S. Application Data

(60) Provisional application No. 61/518,358, filed on May 4, 2011, provisional application No. 61/574,207, filed on Jul. 29, 2011.

(51) Int. Cl.
*B32B 38/00* (2006.01)
*B32B 37/06* (2006.01)
*B32B 37/14* (2006.01)

(52) U.S. Cl.
CPC ............ *B32B 38/0008* (2013.01); *B32B 37/06* (2013.01); *B32B 37/14* (2013.01)

(58) Field of Classification Search
CPC ..... F16D 69/023; C04B 37/00; C04B 37/001; C04B 37/003; C04B 37/005
See application file for complete search history.

(56) References Cited

U.S. PATENT DOCUMENTS

2007/0235123 A1* 10/2007 Simpson et al. ............ 156/89.11
2010/0032286 A1* 2/2010 Koucouthakis et al. ...... 204/164

OTHER PUBLICATIONS

Akselsen, "Advances in brazing of ceramics," Journal of Materials Science, 27(8): 1989-2000 (1992).
Bellosi, et al., "Fast densification of ultra-high temperature ceramics by spark plasma sintering," International journal of Applied Ceramic Technology, 3 (1): 32-40 (2006).
Chamberlain, et al., "Pressureless sintering of zirconium diboride," Journal of the American Ceramic Society, 89 (2): 450-56 (2006).
Chamberlain, et al., "High-strength zirconium diboride-based ceramics," J. Am. Ceram. Soc., 87 (6): 1170-2 (2004).
Chen, et al., "Thermodynamic assessment of B—Zr and Si—Zr binary systems," J. Aloys Compd., 468 (1-2): 209-16 (2009).
Di Prima, et al. "Joining Ultra-High Temperature Ceramics using Refractory Metal Braze Compositions," 35th International Conference & Exposition on Advanced Ceramics & Composites, Daytona Beach, FL (2011).
Esposito, et al., "Joining ZrBz—SiC composites using glass interlayers," J. Mater. Sci., 40 (9-10): 4445-53 (2005).
Fahrenholtz,et al., "Refractory diborides of zirconium and hafnium," Journal of the American Ceramic Society, 90 (5): 1347-64 (2007).
Fahrenholtz, "Thermodynamic analysis of ZrB2—SiC oxidation: Formation of a SiC—depleted region," Journal of the American Ceramic Society, 90 (1): 143-48 (2007).
Han, et al., "Oxidation behavior of zirconium diboride—silicon carbide at 1800°C," Scripta Materialia, 57 (9): 825-28 (2007).
Hulbert, et al., "The absence of plasma in spark plasma sintering," Journal of Applied Physics, 104 (3) Art. No. 033305 (2008).

(Continued)

*Primary Examiner* — Daniel McNally
(74) *Attorney, Agent, or Firm* — McDonnell Boehnen Hulbert & Berghoff LLP

(57) ABSTRACT

The disclosure provides novel composite materials and methods for making such composite materials.

23 Claims, 5 Drawing Sheets

(56) References Cited

OTHER PUBLICATIONS

Hulbert, et al., 'A discussion on the absence of plasma in spark plasma sintering,' Scripta Materialia, 60 (10): 835-38 (2009).

MacDonald and Eagar, "Transient liquid phase bonding," Annual Review of Materials Science, 22(1): 23-46 (1992).

Monteverde, et al., Advances in microstructure and mechanical properties of zirconium diboride based.

Munir, et al., "The effect of electric field and pressure on the synthesis and consolidation of materials: A review of the spark plasma sintering method," Journal of Materials Science, 41 (3): 763-77 (2006).

Olevsky, et al., "Imact of thermal diffusion on densification during SPS," Journal of the American Ceramic Society, 92 (1): S122-32 (2009).

Olevsky, et al., "Constitutive modeling of spark-plasma sintering of conductive materials," Scripta Materialia, 55 (12): 1175-78 (2006).

Opila, et al., "Oxidation of $ZrB_2$—SiC," Ceramic Engineering and Science Proceedings, 22 (3): 221-28 (2001).

Opeka, et al., "Oxidation-based materials selections for 2000° C + hypersonic aerosurfaces: Theoretical considerations and historical experience," Journal of Materials Science 39(19): 5887-904 (2004).

Pine, et al., "Joining Ultra-High Temperature Ceramics Using Boron Rich Braze Materials," 35th International Conference & Exposition on Advanced Ceramics & Composites, Daytona Beach, FL (2011).

Passerone, et al., "Joining of bulk refractory ceramics: interactions, wetting, and interfacial structure," Eur. Space Agency, [Spec. Publ.] ESA SP, 521: 295-301 (2003).

Pinc, et al., "Spark plasma joining of $ZrB_2$—SiC composites using zirconium—boron reactive filler layers," Journal of the American Ceramic Society, Accepted for Publication, Jun. 2011.

Rezaie, et al., "Effect of hot pressing time and temperature on the microstructure and mechanical properties of $ZrB_2$—SiC," Journal of Materials Science, 42 (8): 2735-44 (2007).

Sakuria, et al., "Bonding structure of zirconium diboride joined with filler alloys bearing active metals," J. Japan Inst. Metals, 54(7): 832-38 (1990).

Singh, et al., "Joining and integration of $ZrB_2$-based ultra-high temperature ceramic composites using advanced brazing technology," J. Mater. Sci., 45(16): 4308-20 (2010).

Squire and Marschall, "Material property requirements for analysis and design of UHTC components in hypersonic applications," Journal of the European Ceramic Society, 30(11): 2239-51 (2010).

Yan, et al., "Pressureless sintering of high-density $ZrB_2$—SiC ceramic composites," Journal of the American Ceramic Society, 89 (11): 3589-92 (2006).

Wang, et al. "Processing and mechanical properties of zirconium diboride-based ceramics prepared by spark plasma sintering", Journal of the American Ceramic Society, 90 (7): 1992-97 (2007).

Walker, et al., "Powder processing effects on the rapid low temperature densfication of $ZrB_2$—SiC UHTC composites using SPS," Submitted for publication, May 2011.

Wurster, et al., "Engineering aerothermal analysis for X-34 thermal protection system design," Journal of Spacecraft and Rockets, 36(2): 216-28 (1999).

Yuan, et al., "Microstructure and shear strength of self-joined $ZrB_2$ and $ZrB_2$—SiC with pure Ni," Scr. Mater., 64(1): 17-20 (2011).

Zhang, et al., "Reactive hot pressing of $ZrB_2$—SiC composites," Journal of the American Ceramic Society, 83 (9): 2330-32 (2000).

Zhao, et al., "Directional electromigration-enchanced interdiffusion in the Cu—Ni system," J. Appl. Phys., 102 (11) art. No. 114902 (2007).

\* cited by examiner

COMPOSITE MATERIALS AND METHODS FOR THEIR PRODUCTION

CROSS-REFERENCE TO RELATED APPLICATIONS

This application claims priority to U.S. Provisional Patent Application Ser. Nos. 61/518,358 filed May 4, 2011 and 61/574,207 filed Jul. 29, 2011, each incorporated by reference herein in its entirety.

STATEMENT OF GOVERNMENT RIGHTS

This work was supported under grant number FA9550-10-C-0084 from the AFOSR. The U.S. government has certain rights in the invention.

DESCRIPTION OF RELATED ART

Composite materials that have exceptional high temperature properties make ideal materials for high temperature applications. However, costs associated with post processing machining and integrating ceramic with other materials for use in complex material systems limits their use in many engineering applications. Conventional joining methods include brazing, transient liquid phase bonding, or mechanical fasteners. Although these methods are widely used for most applications, they do have limitations from a production cost and application properties standpoint. These limitations include: 1) extended brazing time periods (>4 hour) due to radiative heating methods, 2) non-homogeneous joint microstructures resulting from filler or braze materials reacting with the base material; and 3) low application temperature due to low melting point brazes or glass materials used with respect to the base ceramic. In addition, traditional joining methods use brazes with compositions different from the substrates, which, in turn, produces joints with microstructures significantly different than the substrates, resulting in dimensioned joint properties.

SUMMARY OF THE INVENTION

In a broad aspect, the disclosure composite materials and methods for producing such composites using current-based joining methods.

In a first aspect, the disclosure provides a composite material comprising two or more units of baseline material joined at a joint interface, wherein the joint interface is homogeneous with the units, wherein the baseline material is the same for each unit, and wherein the baseline material is selected from the group consisting of: a ceramic, a ceramic composite, and a carbon material.

A second aspect of the disclosure provides composite material comprising two units of baseline material joined at joint interface, wherein the joint interface is a transition interphase, wherein the baseline material of each unit is different, and wherein the baseline material is selected from the group consisting of: a ceramic, a ceramic composite, a metal composite, and a carbon material; provided that the two units are not both metal composites.

In a third aspect, the disclosure provides methods of producing a composite material, the methods comprising joining two or more units of baseline material at a joint interface, wherein joining comprises rapid heating by passing a direct current through the joint interface and maintaining the temperature for a period of time sufficient to join the units, wherein the baseline material of each unit is the same or different, and wherein the baseline material is selected from the group consisting of: a ceramic, a ceramic composite, a metal composite, and a carbon material, provided that the composite material does not comprise two or more units of a metal composite.

DETAILED DESCRIPTION OF THE FIGURES

The results set forth herein, and the properties and characteristics of the composites provided by the disclosure, can be advantageously understood with regard to the drawings.

FIG. 1 shows $ZrB_2$—SiC joined with (a) 3.1 $mm^3$ of a pure Zr filler layer at 1735° C. for 1 s, and (b) 3.2 $mm^3$ of zirconium-rich Zr—B filler layer at 1820° C. for 1 s.

FIG. 2 shows $ZrB_2$—SiC joined with 4 $mm^3$ 62 at. % B-38 at. % Zr filler layer at temperatures and hold times of (a) 1700° C. for 1 s, (b) 1800° C. for 1 s, (c) 1800° C. for 300 s. Joint thickness was further decreased by (d) 2 $mm^3$, (e) 1 $mm^3$, and (f) 0.4 $mm^3$ of filler at 1800° C.

FIG. 3 shows cross sections of $ZrB_2$—SiC joined to itself with the dual heating die configuration at a substrate temperatures of a) 1070° C., b) 1320° C., c) 1580° C., and d) 1900° C. The substrates were successfully joined at 1580° C. but did not survive SEM preparation, and no joint was formed at 1070° C. The joining face of one of the $ZrB_2$—SiC parts is shown in these two figures.

DETAILED DESCRIPTION OF THE INVENTION

Figure 1:
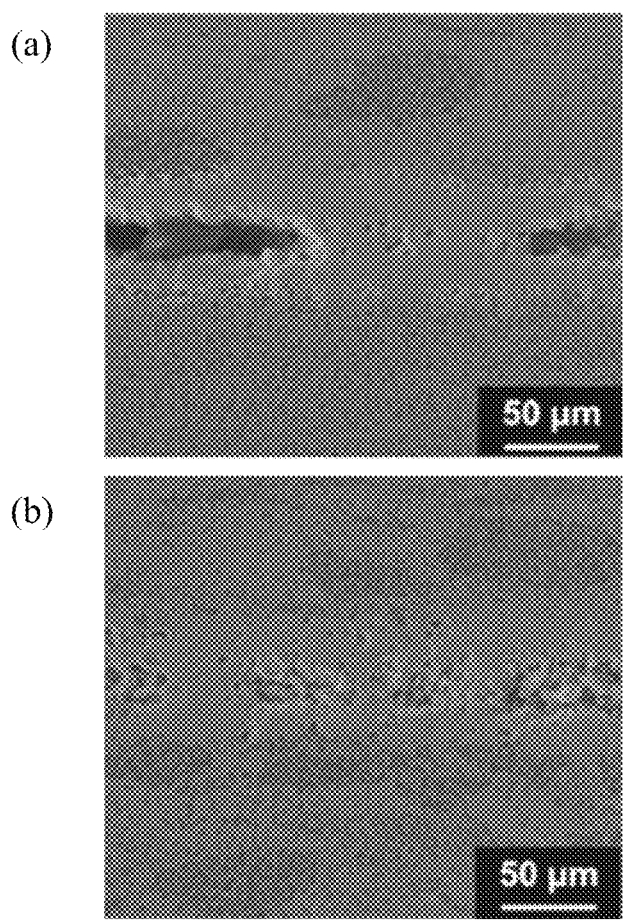

As used herein, the singular forms "a", "an" and "the" include plural referents unless the context clearly dictates otherwise. "And" as used herein is interchangeably used with "or" unless expressly stated otherwise.

All embodiments of any aspect of the invention can be used in combination, unless the context clearly dictates otherwise.

In one aspect, the disclosure provides a composite material comprising two or more units of baseline material joined at a joint interface, wherein the joint interface is homogeneous with the units, wherein the baseline material is the same for each unit, and wherein the baseline material is selected from the group consisting of: a ceramic, a ceramic composite, and a carbon material.

The term "joint interface" as used herein, means a boundary surface where two units are joined (i.e., where the substrates come together).

The term "homogeneous" as used herein, means having the same chemical and structural properties as the baseline elements. For example, a homogeneous joint interface is an interface that has the same chemical composition and structural arrangement as the baseline material units.

The composite materials of this aspect of the present invention comprise a homogeneous joint interface, which exhibits similar properties to the baseline materials. The resulting joint interface exhibits little or no porosity or gaps. As a result of the joint interface microstructure, the joined substrates should exhibit similar room and high temperature mechanical and oxidation resistance properties compared with the baseline substrates. In a further embodiment, the homogeneous joint interface microstructure exhibits identical properties to the baseline materials. The resulting joint interface exhibits no porosity or gaps, and the microstructure of the substrates is continuous across the joint interface essentially making the two units of the composite appear as one part (i.e., no visible joint interface). Having no visible joint interface after joining maintains high integrity of the mechanical properties of the composite across the joint interface. The joined substrates should exhibit identical room and high temperature mechanical and oxidation resistance properties compared with the baseline substrates.

The composites of this aspect of the invention can be prepared, for example, by the methods of the invention disclosed herein, joining units of similar baseline material via methods that either do not include use of a filler, or those that require use of a filler material similar to the baseline material.

The visibility of the joint interface can be determined by any suitable experimental techniques known to those in the art; including but not limited to Scanning Electron Microscope (SEM).

In one embodiment, the baseline material of each unit is a ceramic or ceramic composite. Suitable ceramic baseline materials include, but are not limited to, boride-, carbide-, nitride-, and oxide-based ceramics. Such ceramic materials may form composites. Thus, suitable ceramic composite materials include, but are not limited to, composites of boride-, carbide-, nitride-, and oxide-based ceramics with carbon-carbon composites, and graphite. In one embodiment, the ceramic or the ceramic composite comprises Ultra High Temperature Ceramic (UHTC) material. UHTCs include, but are not limited to, $ZrB_2$, $HfB_2$, $TaB_2$, $TiB_2$, $NbB_2$, TiC, ZrC, NbC, HfC, and TaC. These UHTCs optionally further form ceramic composites with, for example, SiC, $B_4C$, $TaB_2$, or $TaSi_2$. In one particular embodiment, the ceramic baseline material is $ZrB_2$.

In one embodiment, the baseline material of each unit is a carbon material. Suitable carbon baseline materials include, but are not limited to carbon-carbon composites, graphite, graphene, carbon nanotubes, and diamond.

In all of these embodiments, the two or more units of baseline material can be any number suitable for a given composite material. In one embodiment, the composite material comprises two units of baseline material joined at joint interface. As will be understood by those of skill in the art, a composite material may comprise a number of joint interfaces, and thus a composite material may comprise a plurality of joint interfaces, wherein each joint interface is a joining site for two or more units of the baseline material.

It will further be understood by those of skill in the art that the composite materials may be of any size or geometry suitable for a given use and which can be accommodated by appropriate methods for joining the units, such as those disclosed herein. For example, composite materials may include units of the same or similar size and/or shape. Units having a different size and/or shape may provide the composite material having a more complex geometry. Arrangement of units that might be the same or different may also provide for the composite material having a more complex geometry. The composite materials may be very large (e.g., suitable for aerospace or building applications).

The composite materials may be used in any structure for which they are suitable. In various embodiments, the composite materials may be incorporated into structures including, but not limited to aerospace vehicles, in particular, aerospace vehicles which are intended for operation at speeds greater than Mach 4 while maintaining mechanical and thermal properties under extreme aero-thermal heating loads. In this embodiment, the composite materials may comprise two or more units of UHTCs, according to any of the embodiments disclosed above. For example, hypersonic flight vehicles (greater than Mach 8) will undergo extreme aero-thermal heating and will require advanced thermal protection systems (TPS) materials, such as those disclosed herein, in order to survive these environments. The composite materials may also be used in any structure suitable for use in, for example, medical device applications, structural and building applications, electronics applications, and energy application.

It will further be understood by those of skill in the art that the composite materials may be incorporated into larger structures suitable for a given use and which can be accommodated by appropriate methods for joining the units, such as those disclosed herein. Such larger structures include, but are not limited to, aerospace vehicles, rocket, construction materials, and energy materials.

A second aspect of the disclosure provides composite material comprising two units of baseline material joined at joint interface, wherein the joint interface is a transition interphase, wherein the baseline material of each unit is different, and wherein the baseline material is selected from the group consisting of: a ceramic, a ceramic composite, a metal composite, and a carbon material; provided that the two units are not both metal composites.

This transition interphase is a homogeneous mixture of the baseline materials, exhibiting similar properties to the baseline substrates, resulting in there being little visible joint interphase after joining. The transition interphase can be size of about 1 to about 1,000 nm in thickness (as measured from the start of one baseline material to the start of the second baseline material), and has chemical composition comprised of the baseline materials.

The composites of this second aspect of the invention can be prepared, for example, by the methods of the invention disclosed herein, joining two units of different baseline material via methods that either do not include use of a filler, or those that require use of a filler material similar to one or both of the baseline materials.

The composite materials of this second aspect of the present invention comprise an extremely small joint interface, usually less than 1,000 nm, and exhibits very little or no porosity or gaps. Having an extremely small joint interface after joining maintains high integrity of the mechanical properties of the composite across the joint interface. The joined substrates of this second aspect should exhibit very similar room and high temperature mechanical and oxidation resistance properties compared with the baseline substrates. In various embodiments, the joint interface is at about 1 nm to about 1000 nm; about 1 nm to about 500 nm; about 1 nm to about 200 nm; about 10 nm to about 900 nm; about 10 nm to about 800 nm; about 10 nm to about 500 nm; about 200 nm to about 1000 nm; about 200 nm to about 800 nm; about 200 nm to about 500 nm; about 500 nm to about 1000 nm; about 600 nm to about 1000 nm; about 500 nm to about 800 nm; about 600 nm to about 800 nm; or is less than 900 nm, less than 800 nm, less than 500 nm, or is less than 200 nm.

Suitable ceramic, ceramic composite and carbon baseline materials for this second aspect of the invention are the same as those described above for the first aspect of the invention.

In one embodiment, one unit of baseline material is a ceramic or a ceramic composite. In another embodiment, one unit of baseline material is a ceramic or a ceramic composite, and the second unit baseline material is a metal composite. In another embodiment, one baseline material is a ceramic or a ceramic composite, and the second baseline material is a carbon material.

In another embodiment, one unit of baseline material is selected from $ZrB_2$ and $ZrB_2$—SiC. In another embodiment, one unit of baseline material is $ZrB_2$—SiC, and the second unit baseline material is $ZrB_2$. In another embodiment, one unit of baseline material is $ZrB_2$ or $ZrB_2$—SiC, and the second unit baseline material is a titanium alloy.

In another embodiment, one unit of baseline material is $ZrB_2$ or $ZrB_2$—SiC, and the second unit baseline material is a carbon material. In another embodiment, one unit of baseline material is $ZrB_2$ or $ZrB_2$—SiC, and the second unit baseline material is a carbon-carbon composite, graphite, graphene, pyrolitic graphite, or carbon black.

In all of these embodiments, the composite may comprise any number of additional units of joined baseline materials; suitable for a given composite material. These additional units may be the same or different as the two dissimilar units of the composites joined at the transition phase joint interface. As will be understood by those of skill in the art, the resulting composite materials according to this second aspect may comprise a plurality of additional joint interfaces, wherein each joint interface is a joining site for two or more units of baseline material.

It will further be understood by those of skill in the art that the composite materials according to this second aspect of the invention may be of any size or geometry suitable for a given use and which can be accommodated by appropriate methods for joining the units, such as those disclosed herein. For example, composite materials may include units of the same or similar size and/or shape. Units having a different size and/or shape may provide the composite material having a more complex geometry. Arrangement of units that might be the same or different may also provide for the composite material having a more complex geometry. The composite materials may be very large (e.g., suitable for aerospace or building applications).

The composite materials according to this second aspect of the invention may be used in any structure for which they are suitable. In various embodiments, the composite materials may be incorporated into structures including, but not limited to aerospace vehicles, in particular, aerospace vehicles which are intended for operation at speeds greater than Mach 4 while maintaining mechanical and thermal properties under extreme aero-thermal heating loads. In this embodiment, the composite materials may comprise two or more units of UHTCs, according to any of the embodiments disclosed above. For example, hypersonic flight vehicles (greater than Mach 8) will undergo extreme aero-thermal heating and will require advanced thermal protection systems (TPS) materials, such as those disclosed herein, in order to survive these environments. The composite materials may also be used in any structure suitable for implants in, for example, medical device applications, structural and building applications, electronics applications, and energy application.

It will further be understood by those of skill in the art that the composite materials according to this second aspect of the invention may be incorporated into larger structures suitable for a given use and which can be accommodated by appropriate methods for joining the units, such as those disclosed herein. Such larger structures include, but are not limited to, aerospace vehicles, rocket, construction materials, and energy materials.

A third aspect of the disclosure provides a method of producing a composite material, the method comprising joining two or more units of baseline material at a joint interface, wherein joining comprises rapid heating by passing a direct current through the joint interface and maintaining the temperature for a period of time sufficient to join the units, wherein the baseline material of each unit is the same or different, and wherein the baseline material is selected from the group consisting of: a ceramic, a ceramic composite, a metal composite, and a carbon material, provided that the composite material does not comprise two or more units of a metal composite.

The methods of the invention can be used, for example, to rapidly produce the composite materials of the invention disclosed above. In one embodiment, the units are the same, and the method can be used to rapidly produce composite materials according to the first aspect of the invention with a homogeneous joint interface that exhibits identical properties to the baseline materials. In another embodiment, the units are different, and the method can be used to rapidly produce composite materials according to the second aspect of the invention where the joint interface is a transition interphase that is usually less than 1 μm, and exhibits very little or no porosity or gaps.

In one embodiment, the joining two or more units of baseline material at a joint interface is performed without use of a filler material, only the units of baseline material are joined to give the composite material. In this embodiment, the resulting joint interface is homogeneous where the units are the same baseline material, or is a transition interphase where the units are different baseline materials.

In another embodiment, the joining two or more units of baseline material at a joint interface is performed using a filler material that is similar to one or both of the unit baseline materials. In one embodiment, the units are the same baseline material, and the filler is the same material as the baseline material of each unit. In this embodiment, the resulting joint interface is homogeneous as disclosed in the composites of the first aspect of the invention. In this embodiment, the filler material is incorporated into the baseline material(s). In another embodiment, the units are different baseline materials, and the filler may be a mixture of the two baseline materials, or is the same material as one of the unit baseline materials. In this embodiment, the resulting joint interface is a transition interphase as disclosed in the composites of the second aspect of the invention.

Thus, in one embodiment, the filler material may be the same as the baseline material to be joined. Such fillers have the same chemical composition as the baseline material. For example, if the baseline materials are UHTCs such as $ZrB_2$ (or composites thereof), the filler can be a mixture of Zr and B. In another embodiment, the filler material may be a component of the baseline material to be joined. Such fillers do not have the same chemical composition as the baseline materials, but comprise some of the elements of the baseline materials. For example, if the baseline materials are UHTC such as $ZrB_2$ (or composites thereof), the filler can be Zr.

When used, the filler material is placed at the joint interface of the baseline material units. The filler may be provided in any suitable form, including but not limited to powder, foil, pellet, wire, interlayer of form ceramic or composite, etc. In one embodiment, the filler is powder.

As will be understood by those of skill in the art, the specific conditions suitable for joining two units of a composite material will vary to some extent based on the specific materials used. Based on the teachings herein, one of skill in the art can determine appropriate conditions based on the baseline materials of choice.

The methods of the invention comprise passing a direct current through the joint interface, resulting in rapid localized heating at the joint interface. This localized heating assists joining at the joint interface. While not being bound by specific mechanism of actions, the inventors believe that when the current passing through the baseline materials reaches the interface of the baseline materials, there is a reduction in area for the current to pass (due to the surface roughness contact area of the materials) that results in the significantly higher current density at the interface than in the bulk on the baseline material. Such increase in current density and joule heating will cause the localized temperature to increase at the joint interface resulting in higher heating of the joint interface than the bulk on the baseline materials. Any suitable direct current-assisted technique for causing localized heating at the joint interface can be used. In one embodiment, the direct current is passed through the baseline materials perpendicularly to the joint interface (i.e., at an angle of about 90°). In another embodiment, the direct current is passed through the baseline at an angle less than 90°. In another embodiment, the direct current is passed directly through the joint interface (i.e., at an angle of about 0°). In another embodiment, the direct current is passed throughout the baseline materials and the die walls. In another embodiment, the direct current is passed throughout the baseline materials.

Any amount of direct current suitable for joining a particular combination of baseline materials can be used. Specific amount of direct current can be determined by those of skill in the art based on the teachings herein and the specific baseline materials to be used. In one embodiment, the direct current is from about 800 amps to about 30,000 amps. In another embodiment, the direct current is from about 800 amps to about 10,000 amps. In another embodiment, the direct current is from about 1000 amps to about 10,000 amps. In yet another embodiment, the direct current is from about 1000 amps to about 5000 amps. In yet another embodiment, the direct current is from about 1000 amps to about 2000 amps.

The methods of the invention comprise rapid heating at the joint interface. Any rate of rapid heating suitable for joining a particular combination of baseline materials can be used. Specific conditions can be determined by those of skill in the art based on the teachings herein and the specific baseline materials to be used. In one embodiment, the rapid heating is at a rate of about 50° C./minute to about 200° C./minute. In another embodiment, the rapid heating is at a rate of about 80° C./minute to about 150° C./minute. In yet another embodiment of the disclosure, the rapid heating is at rate of about 90° C./minute to about 120° C./minute. In one embodiment of the disclosure, the rapid heating is at rate of about 100° C./minute.

Any time suitable for joining a particular combination of baseline materials can be used. Specific time can be determined by those of skill in the art based on the teachings herein and the specific baseline materials to be used. In various embodiments joining is completed in less than 60 minutes, 45 minutes, 30 minutes, 25 minutes, 20 minutes, 15 minutes, 10 minutes, or less.

Any hold temperature suitable for joining a particular combination of baseline materials can be used. Specific temperature can be determined by those of skill in the art based on the teachings herein and the specific baseline materials to be used. In one embodiment, the temperature that is maintained for joining is from about 800° C. to about 2000° C. In another embodiment, the disclosure provides methods as described above, where the temperature is from about 1300° C. to about 2000° C. In another embodiment, the disclosure provides methods as described above, where the temperature is from about 1500° C. to about 2000° C. In another embodiment, the disclosure provides methods as described above, where the temperature is about 1800° C. to about 1900° C. In another embodiment, the disclosure provides methods as described above, where the temperature is about 1900° C.

Any time suitable for maintaining the temperature when joining a particular combination of baseline materials can be used. Specific time can be determined by those of skill in the art based on the teachings herein and the specific baseline materials to be used. In various embodiments, maintaining the temperature for a period of time sufficient to join the units is at about 1 second to about 15 minutes; about 1 second to about 10 minutes; about 1 second to about 5 minutes; about 1 second to about 2 minutes; about 1 second to about 1 minute; about 30 seconds to about 15 minutes; about 30 seconds to about 10 minutes; about 30 seconds to about 5 minutes; about 30 seconds to about 2 minutes; 30 seconds to about 1 minute; about 1 minute to about 15 minutes; about 1 minute to about 10 minutes; about 1 minute to about 5 minutes; about 1 to about 2 minutes; about 2 minutes to about 15 minutes; about 2 minutes to about 10 minutes; about 2 minutes to about 5 minutes; about 5 minutes to about 15 minutes; about 5 minutes to about 10 minutes; and about 10 minutes to about 15 minutes. In various further embodiments, maintaining the temperature is at about 1 second, about 30 seconds, about 1 minute, about 2 minutes, about 5 minutes, about 10 minutes, or about 15 minutes.

One of the skill in the art will recognize that various parameters of the methods of this third aspect of the invention, such as load applied on the units during joining, area of contact between the two joining units, vacuum within the furnace, etc. may be varied as determined by those of skill in the art based on the teachings herein and the specific baseline materials to be used. Exemplary such conditions are disclosed in the examples that follow.

The baseline material may or may not be encased. Any form of casing suitable for joining a particular combination of baseline materials can be used. Specific casing can be determined by those of skill in the art based on the teachings herein and the specific baseline materials to be used. In one embodiment, the two or more units of baseline material are encased in a die. Exemplary die includes, but is not limited to, graphite dies.

Any technique suitable for joining a particular combination of baseline materials can be used. Specific technique can be determined by those of skill in the art based on the teachings herein and the specific baseline materials to be used. In one embodiment, the joining is performed by Spark Plasma Joining (SPJ). In an exemplary embodiment, methods of the disclosure use Spark Plasma Sintering (SPS) furnace for joining.

It will further be understood by those of skill in the art that the method of disclosure may also comprise rapid cooling of the joined units. Any rate of rapid cooling suitable for a particular combination of baseline materials can be used. Specific conditions can be determined by those of skill in the art based on the teachings herein and the specific baseline materials to be used. In one embodiment, the rapid cooling is at rate of about 50° C./minute to about 200° C./minute. In another embodiment, the rapid cooling is at rate of about 80° C./minute to about 150° C./minute. In yet another embodiment of the disclosure, the rapid cooling is at rate of about 90° C./minute to about 120° C./minute. In one embodiment of the disclosure, the rapid cooling is at rate of about 100° C./minute.

By the way of non-limiting example, UHTC or UHTC composites can be used as baseline materials, with a rapid heating rate of between about 80° C./minute and 150° C., a time for maintaining the temperature of between about 1 second and about 300 seconds, a temperature for joining of between about 1500° C. and about 2000° C., and the direct current of about 800 amps to about 10,000 amps. The baseline materials may or may not be encased in a die. In this embodiment, the pressure applied to the substrates may be from about 1.5 MPa to about 3.5 MPa. The rapid heating may commence after the baseline substrates are at about 600° C. In this embodiment, the method comprises rapid cooling of the joined units with a rate of between about 80° C. and 150° C.

In a further non-limiting example, UHTC or UHTC composites can be used as baseline materials, with a rapid heating rate is about 100° C./minute, a time for maintaining the temperature of between about 1 second and about 300 seconds, a temperature for joining of between about 1500° C. and about 2000° C., and the direct current of about 800 amps to about 2000 amps. The baseline materials may or may not be encased in a die. In this embodiment, the pressure applied to the substrates may be from about 2 MPa to about 3 MPa. The rapid heating may commence after the baseline substrates are at about 600° C. In this embodiment, the method comprises rapid cooling of the joined units with a rate is about 100° C./minute.

In one embodiment, the baseline material is selected from the group consisting of: a ceramic and a ceramic composite. In another embodiment, the ceramic or the ceramic composite comprises Ultra High Temperature Ceramic (UHTC) material as described above. In this embodiment, the filler material may be a component of the ceramic or the ceramic composite. For example, the baseline material may be a ceramic such as $ZrB_2$, $HfB_2$, $TaB_2$, $TiB_2$, $NbB_2$, TiC, ZrC, NbC, HfC, TaC, or a combination thereof, each optionally further forming a composite with SiC, $B_4C$, $TaB_2$, or $TaSi_2$, and the filler is Zr, B, $ZrB_2$, SiC, or a mixture thereof. In yet another embodiment, the baseline material is a ceramic selected from $ZrB_2$ and $ZrB_2$—SiC, and the filler is selected from group consisting of: Zr, B, $ZrB_2$, SiC, and a mixture thereof.

In another embodiment, the filler is Zr. In another embodiment, Zr is in the form of a powder. In another embodiment, Zr is in the form of a foil.

In another embodiment, the filler is a mixture of Zr and B. In one embodiment, the mixture comprises from about 70% to about 90% of Zr. In another embodiment, the mixture comprises from about 80% to about 90% of Zr. In yet another embodiment, the mixture comprises from about 85% to about 87% of Zr. One embodiment provides a mixture comprising about 86.2% of Zr and about 13.8% of B. In another embodiment, the filler is a mixture of Zr and B. In one embodiment, the mixture comprises from about 20% to about 50% of Zr. In another embodiment, the mixture comprises from about 30% to about 40% of Zr. In yet another embodiment, the mixture comprises from about 36% to about 39% of Zr. One embodiment provides a mixture comprising about 38% of Zr and about 62% of B.

By the way of non-limiting example, UHTC or UHTC composites can be used as baseline materials, and the fillers may be selected from the group consisting of Zr, B, $ZrB_2$, SiC, and a mixture thereof, with a rapid heating rate of between about 80° C./minute and 150° C./minute, a time for maintaining the temperature of between about 1 second and about 300 seconds, a temperature for joining of between about 1500° C. and about 2000° C., and the direct current of about 800 amps to about 10,000 amps. The baseline materials may or may not be encased in a die. In this embodiment, the pressure applied to the substrates may be from about 1.5 MPa to about 3.5 MPa. The rapid heating may commence after the baseline substrates are at about 600° C. In this embodiment, the method comprises rapid cooling of the joined units with a rate of between about 80° C./minute and 150° C./minute.

In another non-limiting example, UHTC or UHTC composites can be used as baseline materials, and the fillers may be selected from the group consisting of Zr, B, $ZrB_2$, SiC, and a mixture thereof, with a rapid heating rate is about 100° C./minute, a time for maintaining the temperature of between about 1 second and about 300 seconds, a temperature for joining of between about 1500° C. and about 2000° C., and the direct current of about 800 amps to about 2000 amps. The baseline materials may or may not be encased in a die. In this embodiment, the pressure applied to the substrates may be from about 2 MPa to about 3 MPa. The rapid heating may commence after the baseline substrates are at about 600° C. In this embodiment, the method comprises rapid cooling of the joined units with a rate is about 100° C./minute.

By the way of non-limiting example, UHTC or UHTC composites can be used as one baseline material and carbon material can be used as the second baseline material, with a rapid heating rate of between about 80° C./minute and 150° C., a time for maintaining the temperature of between about 1 second and about 300 seconds, a temperature for joining of between about 1500° C. and about 2000° C., and the direct current of about 800 amps to about 10,000 amps. The baseline materials may or may not be encased in a die. In this embodiment, the pressure applied to the substrates may be from about 1.5 MPa to about 3.5 MPa. The rapid heating may commence after the baseline substrates are at about 600° C. In this embodiment, the method comprises rapid cooling of the joined units with a rate of between about 80° C. and 150° C.

In a further non-limiting example, UHTC or UHTC composites can be used as one baseline material and carbon material can be used as the second baseline material, with a rapid heating rate is about 100° C./minute, a time for maintaining the temperature of between about 1 second and about 300 seconds, a temperature for joining of between about 1500° C. and about 2000° C., and the direct current of about 800 amps to about 2000 amps. The baseline materials may or may not be encased in a die. In this embodiment, the pressure applied to the substrates may be from about 2 MPa to about 3 MPa. The rapid heating may commence after the baseline substrates are at about 600° C. In this embodiment, the method comprises rapid cooling of the joined units with a rate is about 100° C./minute.

EXAMPLES

Those having skill in the art will recognize that the starting materials and method conditions/parameters may be varied, the sequence of the method steps altered, and additional steps employed to produce composites encompassed by the present disclosure, as demonstrated by the following examples. Starting materials can be obtained from commercial sources or prepared by well-established literature methods known to those of ordinary skill in the art. This will sometimes require a judgment to modify the order of the method steps or to select one particular process scheme over another in order to obtain a desired composite of the disclosure.

The preparation of the composite materials of the disclosure is illustrated further by the following examples, which are not to be construed as limiting the disclosure in scope or spirit to the specific procedures and composites described in them.

Example 1

Preparation of $ZrB_2$—SiC $ZrB_2$ (70 Vol. %) was joined with SiC (30 Vol. %). In short, raw materials ($ZrB_2$ and SiC) were obtained from HC Starck. Initial samples were prepared by ball milling powders for 24 hours in IPA using WC milling media. Large billets were hot pressed inside a resistively heated, graphite hot press (vacuum, 27 MPa, 2100° C., and 30 min soak). A sandwich joining configuration was selected for initial testing. The UHTC materials were diamond machined into small square specimens (about 3×14×14 mm). Mating surfaces were ground with a 600 grit wheel. Size and geometry were selected to fit within the cylindrical graphite die and punch assembly used in the SPS. The area joined was calculated to be 36 mm$^2$.

Example 2

SPS Furnace Joining Method

A Thermal Technology (Santa Rosa, Calif.) 10-3 spark plasma sintering (SPS) furnace was used to heat and join the various substrates, with our without filler material. If the filler material was used, the filler material was sandwiched between two substrates and loaded into graphite dies on 20 mm graphite punches. The substrates were loaded with the joint faces perpendicular to the punches, so that any applied pressure on the punches would compress the filler material between the substrates. Graphite foil was placed around the inner wall of the die and between the substrates and punches in order to assure good contact between graphite parts and the ceramic substrates. The graphite die and substrates were loaded into the SPS and pumped down to vacuum. Once a minimum vacuum of 25 mtorr was achieved, the furnace was turned on and heating began.

Temperature was measured by a pyrometer aimed at a hole drilled half way through the graphite die (located at the approximate location of the ceramic substrates). The furnace was heated to 600° C. and held for 10 seconds to allow for the pyrometer to engage. A heating rate of 100° C./minute was used to reach the target/maximum temperature. The furnace was held at the target temperature for a specified hold time which ranged from 1-300 seconds. After holding, the furnace was cooled down at a rate of 100° C./minute to room temperature. Additionally, a 2.5 MPa pressure was applied to the punches and substrates during joining in the SPS. The displacement sensor resolution was also modified to allow monitoring and measuring the joining displacement in situ at temperature. Overall, joining of the various substrates in the SPS was accomplished in under one hour.

Example 3

Microstructural Characterization

After joining was completed, the parts were cross-sectioned and polished to a 3 µm diamond finish. The joint was imaged using a FEI Inspec-S Scanning Electron Microscope (SEM). The SEM images were used to measure joint thickness and joint porosity. Images were processed using analytical software. Based on the SEM analysis, filler and no filler compositions and process conditions were selected for detailed mechanical and oxidative testing.

Example 4

Oxidation Resistance

The oxidation resistance of the joined parts was compared with baseline $ZrB_2$—SiC substrates to investigate whether the joint regions preferentially oxidized over the base material. Joined parts were cross sectioned and ground to a 6 µm finish. Parts were placed in a box furnace and heated at a rate of 20° C./min to the test temperature where it was held at for one hour then cooled 20° C./min to room temperature. Oxidation testing was done at three temperatures; 1500, 1600, and 1700° C. for each joint. For comparative purposes, $ZrB_2$—SiC substrates were also oxidized at the three temperatures. The mass of the parts before and after oxidation was measured and compared with the baseline substrates. Additionally, the oxidized joints were cross-sectioned, polished, and imaged by SEM.

Example 5

Shear Strength: Room Temperature

Shear strength of the joints and ceramic substrates were measured at room temperature by compressing doubly notched samples using an adapted/modified version of ASTM C1292. Samples were notched using a diamond cutting blade on a CNC surface grinder using a horizontal speed of 20 mm/s. Notches (1.25 mm wide) were cut through the samples on opposite sides and spaced 2 mm apart. Notch depth was 0.5 that of the sample thickness. Samples were loaded into the test fixture and the alignment was checked to minimize torsional loading. The horizontal clamps were finger tightened to provide lateral/buckling support to the sample without providing unneeded stress. The sample was pre-loaded with a compressive load of <3N. Testing was conducted using a displacement rate of 1 mm/min.

Example 6

Shear Strength: High Temperature

Shear strength was also measured at elevated temperatures also using a double-notched compression test. The same notch geometry used in the room temperature test was used for the elevated temperature tests. A simpler fixture was created for high temperature testing by machining a slot into a graphite plate with a depth of ~13 mm (~1 mm shorter than the sample height). The slot provides the lateral support and the 1 mm protrusion of the sample allows a top ram to apply the compressive force.

UHTC samples were ground to a sliding fit to accommodate the thermal mismatch between the sample and the graphite fixture. All samples were coated with a thin layer of BN to prevent reaction with the graphite fixture. The sample and plate were loaded into ACM's hot press and the distance between the sample's top surface and the top ram was brought to about 1.5 mm. The furnace was heated to 1350° C. using an approximate heating rate of 15° C./min and the atmosphere was flowing argon. The sample was held at temperature for 20 minutes. Pressure was applied via a hydraulic hand pump placed under the lower ram of the press until fracture occurred. Shear strength was calculated based on the maximum load observed.

Example 7

Joining Composite Materials with Filler

Filler materials used were composed of various compositions of zirconium and boron and were based on the Zr—B phase diagram. By using compositions located in various regions of the Zr—B phase diagram, it was believed that joints with differing properties could be produced (such as: ductility, melting temperature, etc.) to fit variable application requirements. These compositions included pure zirconium filler, mixtures of boron and zirconium, and a 'reaction mixture' was investigated which was composed of $ZrB_2$, SiC, Zr, and B.

The pure zirconium fillers were prepared by using zirconium foil or pure zirconium powder. Zirconium foil was obtained from Sigma Aldrich (Milwaukee, Wis.) 4.6 g and was 100 µm thick, and was used without modification as a filler material. Zirconium powder and boron powder were both purchased from Alfa Aesar (Ward Hill, Mass.) at 2-3 µm and <5 µm, respectively. Zirconium diboride and silicon carbide powder were obtained from H.C. Stark (Goslar, Germany) at 3-5 µm and 700 nm, respectfully. The zirconium powder was rinsed with acetone under vacuum filtration to remove the oil that it was stored in. Zirconium and boron rich mixtures were either prepared by massing out boron powder and acetone rinsed zirconium powder to give the desired composition, or by massing out boron powder and acetone rinsed zirconium powder and dispersing them in hexane (the hexane dispersed powder was applied to the face of the ceramic substrates and the hexane was allowed to evaporate).

Another filler was made by first making $ZrB_2$—SiC (25% by volume powder); the two powders where mixed and attrition milled for 2 hours using tungsten carbide media in hexane. The hexane was removed via roto-evaporation and the resulting powder was then sieved to 150 µm. To this powder, B powder, cleaned Zr powder, and SiC powder were added to attain a 30% volume of SiC and a 10% volume of unreacted Zr/B powder at a 1:2 ratio. This mixture was then spec milled for 12 minutes under ethanol, dried with roto-evaporation and then sieved to 100 µm. The final composition of the 'reaction mixture' filler powder was 32.7 at % SiC, 44.2 at % $ZrB_2$, 20.1 at % B, and 3.9 at % Zr.

In addition to compositional changes, other variables were also altered in order to achieve desired microstructures and joint thicknesses. Variables investigated included: filler material mass, target temperature, and the hold time at target temperature. A summary of all the joints produced with the various fillers, target temperatures, and hold times is presented in Table 1.

TABLE 1

Filler compositions

| Composition | Temperature (° C.) | Hold Time (sec.) | Theoretical Thickness (µm) (Based on mass of powder) | Measured Thickness (µm) | Porosity (%) |
|---|---|---|---|---|---|
| 100% Zr (foil) | 1600 | 1 | 47 | 57 | 17 |
| 100% Zr (foil) | 1700 | 1 | 47 | 48 | 29 |
| 100% Zr (foil) | 1740 | 1 | 47 | 62 | 19 |
| 100% Zr (foil) | 1870 | 1 | 47 | 76 | 11 |
| 100% Zr (Powder) | 1740 | 1 | 47 | 45 | 13 |
| 86.2 at % Zr - 13.8 at % B | 1600 | 1 | 49 | 84 | 23 |
| 86.2 at % Zr - 13.8 at % B | 1670 | 1 | 49 | 53 | 34 |
| 86.2 at % Zr - 13.8 at % B | 1750 | 1 | 16 | 94 | 6 |
| 86.2 at % Zr - 13.8 at % B | 1820 | 1 | 16 | 73 | 21 |
| 86.2 at % Zr - 13.8 at % B | 1750 | 1 | 8 | 23 | 12 |
| 86.2 at % Zr - 13.8 at % B | 1750 | 1 | 4 | 25 | 12 |
| 86.2 at % Zr - 13.8 at % B | 1750 | 60 | 16 | 35 | 9 |
| 86.2 at % Zr - 13.8 at % B | 1750 | 300 | 16 | 7 | 53 |
| 38 at % Zr - 62 at % B | 1850 | 1 | 20 | 110 | 44 |
| 38 at % Zr - 62 at % B | 1800 | 1 | 20 | 37 | 21 |
| 38 at % Zr - 62 at % B | 1800 | 60 | 20 | 17 | 14 |
| 38 at % Zr - 62 at % B | 1800 | 300 | 10 | 12 | 5 |
| 38 at % Zr - 62 at % B | 1800 | 60 | 5 | Minimum | — |
| 38 at % Zr - 62 at % B | 1800 | 300 | 5 | Minimum | — |
| 38 at % Zr - 62 at % B | 1800 | 60 | 2 | Minimum | — |
| 38 at % Zr - 62 at % B | 1800 | 300 | 2 | Minimum | — |
| 38 at % Zr - 62 at % B | 1750 | 1 | 20 | 48 | 17 |
| 38 at % Zr - 62 at % B | 1700 | 1 | 60 | 90 | 24 |
| 38 at % Zr - 62 at % B | 1700 | 60 | 20 | 40 | 14 |
| 38 at % Zr - 62 at % B | 1650 | 1 | 60 | 120 | 75 |
| 38 at % Zr - 62 at % B | 1550 | 1 | 60 | 140 | 75 |
| 35 at % Zr - 65 at % B | 1650 | 1 | 62 | 79 | 38 |
| 35 at % Zr - 65 at % B | 1559 | 1 | 62 | 161 | 54 |
| 30 at % Zr - 70 at % B | 1700 | 1 | 65 | 82 | 35 |
| 30 at % Zr - 70 at % B | 1600 | 1 | 65 | 105 | 46 |
| 30 at % Zr - 70 at % B | 1850 | 1 | 22 | 47 | 22 |
| 'reaction mixture' filler | 1600 | 300 | 10 | 32 | 50 |
| 'reaction mixture' filler | 1800 | 300 | 10 | Minimum | — |

The theoretical joint thickness was calculated to allow for comparisons of the amount of filler used across compositions. Theoretical thickness is based on the filler composition and mass prior to joining Example 7A Results of Zr Foil-Based Filler Joining Zr foil melts, which allows critical wetting and spreading to take place reproducibly within the joint. The UHTC samples joined, under vacuum, resulted in a homogenous interface with limited porosity. Porosity (~20%) was visible throughout the length of the joint. The thickness of the joint interface was ~70 µm thick (compared to foil thickness of 300 µm). Porosity was found at the center of the foil and suggested that the time at temperature may be too long. The results also showed exaggerated grain growth at the joint. As expected, the Zr foil reacted well with the base material and did not allow Si to migrate into the joint region. The same configuration was joined under Ar at 1855° C. (10 seconds). The microstructure showed there was significantly more porosity at the joint, under Ar, than under vacuum. The joint was also depleted of Si and underwent grain growth of the Zr under those conditions as well.

Example 7B

Results of Pure Zr Filler Joining

Utilizing 60 mg of zirconium foil, joining was conducted at temperatures ranging from 1600° C. to 1870° C. with one second hold times. FIG. 1a illustrates one experiment. Regardless of the final target temperature, the zirconium filler produced joints with large thicknesses (+50 µm) and large amounts of porosity (particularly in the middle of the joint). Joints produced with zirconium powder had a similar morphology. Despite the porosity in the joint, the filler material and substrate appeared to be well bonded at the joint/substrate interface. Additionally, significant carbon was detected in the joint by energy dispersive spectroscopy (EDS) analysis, indicating the zirconium filler may have reacted with the ceramic substrate. Additional experiments were performed to confirm that the pure zirconium filler reacted with the silicon carbide in the ceramic substrates to form zirconium carbide and zirconium-silicon (SiZr) intermetallics.

Example 7C

Results of Zirconium-Rich Zr—B Filler Joining

Zirconium-rich Zr—B filler (86.2 at % Zr-13.8 at % B) was investigated at various temperatures, hold times, using different masses of filler. FIG. 1b illustrates one experiment. At lower target temperatures (and one second holds), the mid joint porosity was significantly less that observed in the pure zirconium filler mid joint region. Instead, a uniform joint was formed with limited porosity (<10%). At these temperatures, however, joint thicknesses were over 100 µm. To reduce joint thickness, higher temperatures were investigated. Utilizing a higher target temperature resulted in decreased joint thickness (73 µm for the 1820° C. joint compared to 94 µm at 1750° C.), but porosity at mid joint was found. Similar to what was observed in the pure zirconium filler, at higher temperatures the Zr—B filler reacted with the $ZrB_2$—SiC substrates, which is believed to be the cause of high porosity in the joint.

Example 7D

Results of Boron-Rich Zr—B Filler Joining

Figure 2:
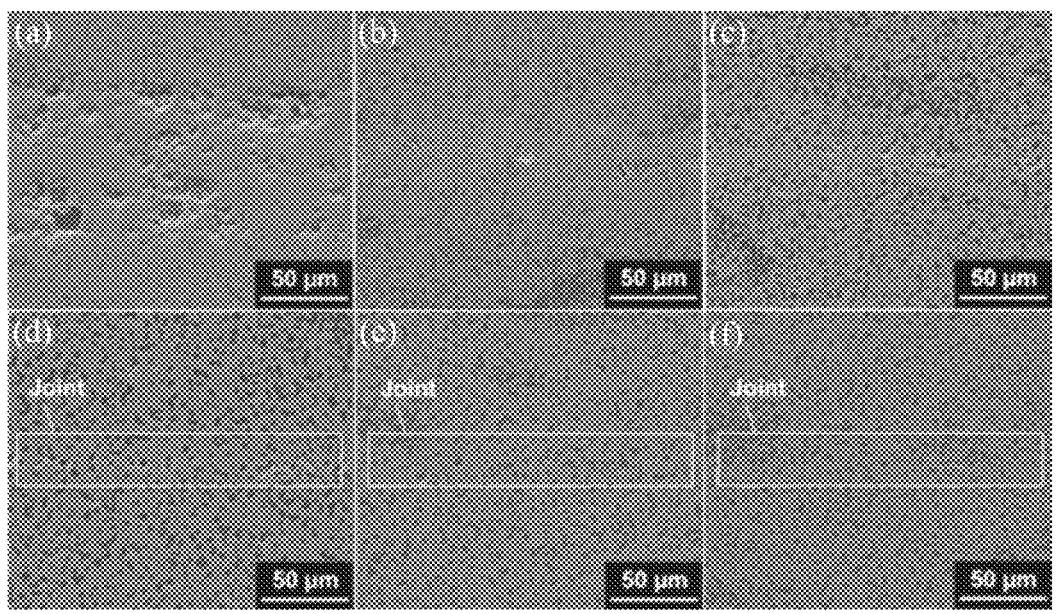

Three boron rich fillers were investigated: 62 at % B, 65 at % B, and 70 at % B—Zr balance. Several target temperatures were used for each filler composition. Generally, it was found that temperatures under 1700° C. produced porous joints (>50%) with thicknesses over 100 µm when a hold time of one second was used. The joint thickness of the 38 at % Zr-62 at % B filler was decreased by increasing the target temperature. Increasing the target temperature to 1750° C. and to 1800° C. (with one second holds) decreased joint thicknesses by 50% (FIGS. 2a and 2b). Utilizing 1800° C. as a target temperature with one second of hold, resulted in joints under 40 µm thick with little porosity. Further improvement of the joint microstructure was achieved by increasing the hold time at the target temperature and decreasing the mass of filler used. Hold times of 1, 60, and 300 seconds were investigated with a target temperature 1800° C. and 20 mg of filler material. Increasing the hold time from 1 second to 300 seconds decreased thicknesses of the joint to ~25 µm (FIG. 2c). Joining at 1800° C. and holding for 300 seconds produced a joint with a ~10 µm thickness. Finally, applying a smaller mass of filler material (e.g., 10, 5, and 2 mg) onto the ZrB2-SiC substrates resulted in improved joint thickness. FIGS. 7d, 7e, and 7f show results for three different thickness of filler. Using 5 and 2 mg of filler material, the joint thickness was minimized (<<10 µm) producing two ceramic substrates that appear almost monolithic, with the discontinuity of SiC being the only clue as to the location of the joint. The 2 mg joint had slightly more porosity between the two substrates compared to the 5 mg joint.

Example 7E

Results of 'Reaction Mixture' Filler Joining

A 10 mg of filler composed of $ZrB_2$, SiC, Zr, and B was subjected to two target temperatures, 1600 and 1800° C., and hold times of 300 seconds. These fillers showed a significant temperature dependence of the microstructure. The joint conducted at 1600° C. was 30 µm thick and exhibited porosity; and the joint conducted at 1800° C. was decreased to <10 µm. Some areas of the joint exhibited no joint region at all. Additionally at the higher temperature, the SiC in the joint region and in the substrate appeared interlocked.

Example 8

Mechanical and Oxidation Testing of Joint with 38 at % Zr-62 at % B Filler

Boron-rich filler (5 mg, 38 at % Zr-62 at % B joined at 1800° C. for 300 seconds) and the 'reaction mixture' filler (10 mg, joined at 1800° C. for 300 seconds) materials and processes were selected for mechanical characterization. Shear strengths of baseline and joined samples were determined using doubly notched samples loaded in compression until failure. Initial testing was performed on the baseline substrate material to identify suitable test conditions and test geometries (notch/gap spacings). The shear stress values for the baseline samples varied (across all sample configurations) from 256-381 MPa. Samples tested with a 3 mm gap showed a lower shear strength compared to smaller gap spacings. In addition, the 3 mm post test fracture pattern varied with fractures observed parallel and perpendicular to the intended shear plane. Testing performed using smaller gap spacings showed a higher average shear strength as well as different failure/fracture modes. In sample sets with 1 and 2 mm gap spacing, the fracture pattern occurred along the (expected) shear plane (always producing two monolithic remnants). Thus, 2 mm configuration was selected for the testing of the various fillers.

The average shear strength of the boron-rich filler at room temperature was measured to be 311±38 MPa. Compared with the average shear strength of the baseline $ZrB_2$—SiC substrate (345±40 MPa), the boron-rich joint had shear strengths equal to ~90% of the substrates. Based on the sample to sample variation, the shear strengths are statistically similar. The room temperature shear strength of the 'reaction mixture' filler joints were measured to be 120±32 MPa, ~35% of baseline substrates. In comparison, joined SiC/SiC composites exhibit shear strength of 92° C., joined $Y_2O_3$/$ZrO_2$ composites exhibit shear strength of 104-116° C., and 1-D carbon/carbon composites exhibit shear strength of 11.3±2° C.

The failure modes in the boron-rich filler samples were similar to that observed in the baseline samples with failure occurring in the targeted shear plane. Analysis of the failure/fracture surfaces showed two different macroscopic phenomena: highly fractured failure surface and a un-fractured surface. The highly fractured surface suggests that a very strong joint formed, which allows for a failure mode similar to a monolithic substrate.

A detailed analysis of the fracture surface of the $ZrB_2$—SiC substrates from the room temperature shear testing indicated that the failure occurred over multiple planes. Higher magnification images showed that intergranular failure occurred, which is typical of brittle fracture. The fracture surface of the boron-rich filler was similar to the baseline substrates. Failure occurred over multiple and was intergranular, just as was observed in the fracture surfaces of the baseline material. Failure over multiple planes indicated the failure did not occur solely at the joint, rather failure also occurred/branched into the ceramic substrates, indicating strong bonding between the filler material and substrates. Examination of the fracture surface cross section of the boron-rich filler also shows failure beginning in areas in the substrate. Overall, the fracture surfaces give further evidence that the boron-rich filler exhibited almost identical mechanical properties to the baseline material.

The fracture surface of the 'reaction mixture' filler (after room temperature shear testing) shows that fracture occurred over a single plane after an initial step down from the notch. Higher magnification images showed that intergranular failure occurred as was observed with the boron-rich filer and ceramic substrate. Based on the overall fracture surface, failure likely occurred mainly in the joint, which would be expected given the low shear strength measured from the 'reaction mixture' filler.

High temperature shear strengths of joints was tested on two samples from the $ZrB_2$—SiC baseline material, boron-rich filler and the 'reaction mixture' filler. The baseline samples showed shear strength of 266±18 at 1350° C. There were some off-plane fracture directions and the fracture surface. The measured baseline values are ~77% than those observed at room temperature. In comparison, joined SiC/SiC composites exhibit shear strength of 71 at 1200° C., and 1-D carbon/carbon composites exhibit shear strength of 9.3±2.6 at 1000° C.

The boron-rich filler joined samples showed very good in plane failures and gives much higher confidence than the (high temperature) baseline values. These samples showed shear strength of 284±31 at 1350° C., which is ~91% of the room temperature value and ~82% of the baseline room temperature value. The testing on the reaction mixture filler was not completed.

Oxidation testing was done at three temperatures for the boron-rich and 'reaction mixture' filler, and the ceramic substrates. Table 2 shows the weight changes observed for the samples at the three test temperatures. The ceramic substrates and boron-rich joints both gained 0.7% and ~3% mass after oxidation testing at 1500 and 1600° C. respectively, indicating joining with the boron-rich filler did not adversely affect oxidation resistance of the ceramic parts. Additionally at 1700° C., the boron-rich filler exhibited similar mass loss of −10.5% compared to the ceramic substrate (−13.6%) also indicating no decrease in oxidation protection with the joint. At 1500° C., the 'reaction mixture' filler joint also exhibited a comparative mass gain compared to the ceramic substrate. The mass gain and loss at 1600 and 1700° C. were notably higher for the 'reaction mixture' filler, at +7.2% and −29.2% respectively. Based on the mass changes, joining with the 'reaction mixture' filler did affect oxidation resistance of the joined $ZrB_2$—SiC parts.

TABLE 2

| Mass Changes Observed During Oxidation Testing | | | |
|---|---|---|---|
| Sample | 1500° C. | 1600° C. | 1700° C. |
| $ZrB_2$—SiC baseline sample | +0.7% | +3.2% | −13.6% |
| boron-rich filler (38 at % Zr - 62 at % B) | +0.7% | +3.5% | −10.5% |
| 'reaction mixture' filler | +1.0% | +7.2% | −29.2% |

After oxidation, the substrates were cross-sectioned and analyzed by SEM. The baseline substrates exhibited an increasing oxide scale thickness with increasing oxidation temperatures of 1500, 1600, and 1700° C. The boron-rich filler- and 'reaction mixture' filler-joined substrates exhibited similar oxide scale thicknesses at each temperature compared to the baseline substrates. Additionally, no preferential oxidation was observed at the joint region for either filler. Based on this, it is unclear why there were significant differences in the oxidative mass change for the 'reaction mixture' filler samples compared to the boron-rich filler and baseline samples. The joint region for the 'reaction mixture' filler was thicker with more porosity compared to the boron-rich filler joint region, however no oxidation products were observed in the joints.

Example 9

Joining Composite Materials without Filler

Discs of $ZrB_2$—SiC (25 vol % SiC) (20 mm diameter and 2 mm thick) for joining are pressure densified using ceramic powder processing and SPS (SPS 10-3, Thermal Technologies, Santa Rosa Calif., USA). Briefly, the $ZrB_2$—SiC powders are ball milled in hexane for 24 hours, roto-evaporated, sieved to 150 μm, and densified using a heating rate of 100° C./min to 1800° C. and held for five minutes under an applied pressure of 35 MPa from the start of heating. $ZrB_2$ substrates for joining are processed identical to $ZrB_2$—SiC. Substrate densities are >99% theoretical density as measured by Archimedes method. A 6 μm finish is applied to the two flat faces that are to be joined and placed in contact with each other upon loading into a graphite die (20 mm inner diameter). In order to ensure good contact for conduction (both direct current and conductive and radiant heat) graphite foil is placed in between the punches and substrates and radially along the inner die wall. Upon loading the substrates and die assembly, an applied pressure of 2.5 MPa is set for the duration of the joining run while under vacuum (25 mtorr). A pyrometer is aimed at a hole drilled halfway through the graphite die (6 mm from inner wall) at the approximate location of the UHTC substrates. The ramp rate, hold temperature, and current are based on this control pyrometer (Raytek, Model RAYMM1MHVF1V, Berlin Germany).

The heating schedule used initial heating up to 600° C. (30% power), 100° C./min to the target joining temperature, one minute hold, and cooled using 100° C./min to 1000° C. after which the furnace is powered off. Substrates are removed from SPS chamber after a total joining time, from start to finish, of 30 minutes or less. The substrates are heated to a control temperature of 1800° C. while concurrently recording the substrate and thermocouple temperatures. Based on these direct temperature measurements, the pyrometer control temperatures used gave substrate temperatures of: 1900, 1580, 1320, and 1070° C. Three different die configurations are used: dual heating configuration allowing current to flow through both the die walls and the substrate; the die heating configuration that prevents any current from flowing through the substrate; and direct current configuration which forces all the current through the substrates. Successful joints are cross-sectioned and polished to a 0.25 μm finish for imaging by a scanning electron microscope (SEM) (S-4800, Hitachi Inc., Pleasanton, Calif.). The joining face of unsuccessful joints is imaged without any further sample preparation. Chemical analysis using energy-dispersive spectroscopy (EDS) (ThermoNORAN-NSS, Thermo Scientific, Middleton, Wis.) is used to analyze joint purity and faces of unsuccessful joints for oxygen contamination across an area and single grains of $ZrB_2$ and SiC.

Figure 3:
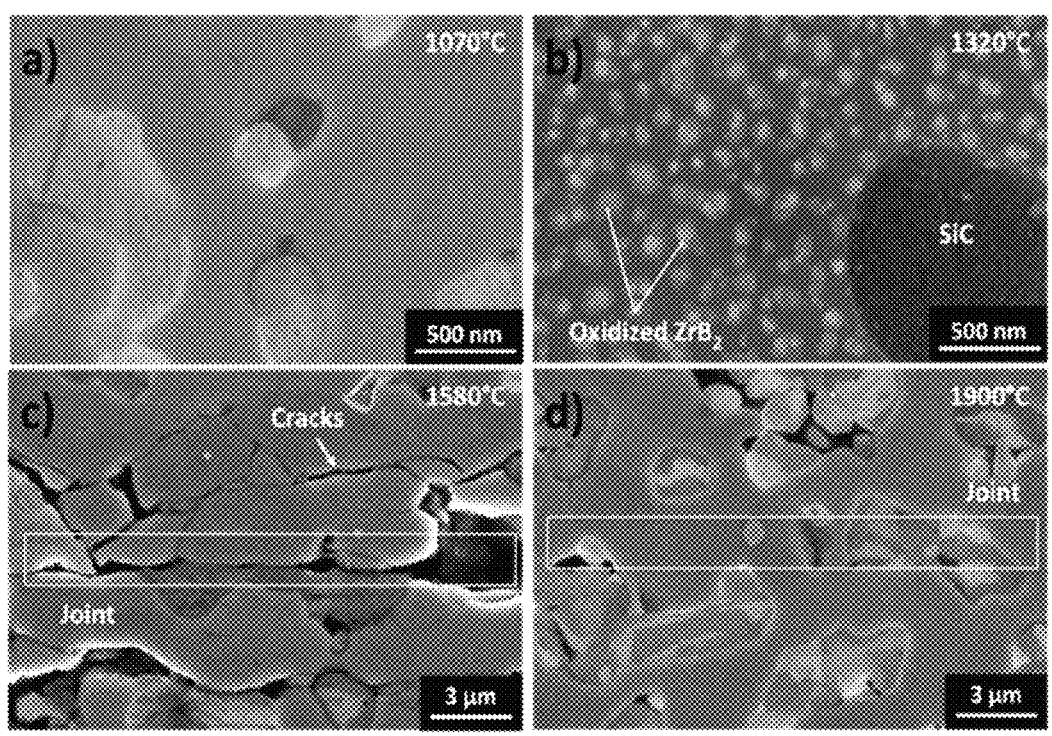

The direct current heating joints use the highest substrate current densities (204-281 Amps/cm$^2$), followed by the dual heating (56-86 Amps/cm$^2$) and then die heating which has 0 Amps/cm$^2$ substrate current density. The direct current heating configuration successfully forms joints at all of the joining temperatures (1070, 1320, 1580, 1900° C.). The dual heating configuration produce joints at 1320, 1580 and 1900° C. (as illustrated in FIG. 3 and discussed below). The die heating configuration only forms joints at 1580 and 1900° C.

FIG. 3 shows the $ZrB_2$—SiC joints that are formed using the dual heating die configuration and substrate joining temperatures of 1070, 1320, 1580, and 1900° C. At 1070° C., no joint was produced and the two parts remain separate substrates. The joining face for one of the substrates (FIG. 3a) appears unaltered compared to as-sintered parts. EDS analysis detects approximately stoichiometric $ZrB_2$ and SiC on the face of the substrate with oxygen content under 1 wt % for both $ZrB_2$ and SiC grains. At 1320° C. the two substrates are bonded, however, during sample preparation the two substrates became separate. The face of the unbonded substrate (FIG. 3b) shows a microstructure with lights spots on the ZrB$_2$ grains that have a measured increase in oxygen content (10 wt %) oxidation of ZrB$_2$ into ZrO$_2$ spots. At 1580° C. the substrates join and cross sections (FIG. 3c) show partially joined microstructures with gaps at the interface of the substrates and cracks near the joint region. At 1900° C. (FIG. 3d) a homogeneous joint microstructure is observed that is free of gaps and porosity across the joint with no detectable oxides and is seamless between the two substrates.

While not being bound by one particular theory, the inventors believe that the mechanisms by which ZrB$_2$—SiC and ZrB$_2$ are joined by SPS involves several processes. At the interface of the two substrates current density increases significantly due to the limited contact area of the substrates, resulting in localized heating at the interface. The localized heating facilitates partial joints to be formed at lower temperatures (1070-1320° C.) by oxidation, forming a bond between the substrates. At higher temperatures (1900° C.) the complete joint is formed by 1) removal of the oxidation layer by diffusion of oxygen into the bulk, 2) hot forging of the substrates together, and 3) removal of porosity at the joint by densification mechanisms.

Example 10

Joining ZrB$_2$ Composite Materials without Filler

Figure 4:
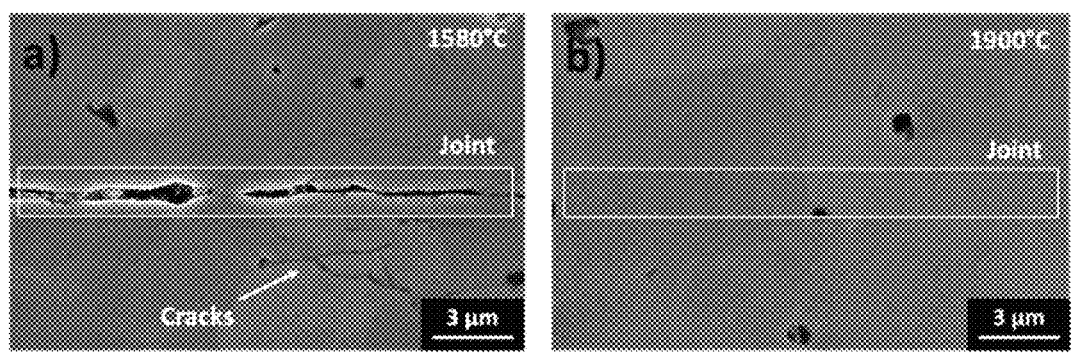
FIG. 4 shows cross sections of $ZrB_2$ joined to itself using the dual heating configuration at substrate temperatures of a) 1580° C. and b) 1900° C.

ZrB$_2$ materials (without SiC additions) are also joined at substrate temperatures of 1580 and 1900° C. using the dual heating and die heating configurations. The dual heating configuration forms a partial joint at 1580° C. and shows cracking around areas of the joint (FIG. 4a). The die heating configuration forms a partial joint at 1580° C. and no cracking around the joint is observed. Both the die heating and dual heating configurations result complete joints with microstructures that are identical to baseline ZrB$_2$ at 1900° C. (dual heating configurations results are shown in FIG. 4b).

Example 11

Joining ZrB$_2$ Composite Material with Carbon Material

Figure 5:
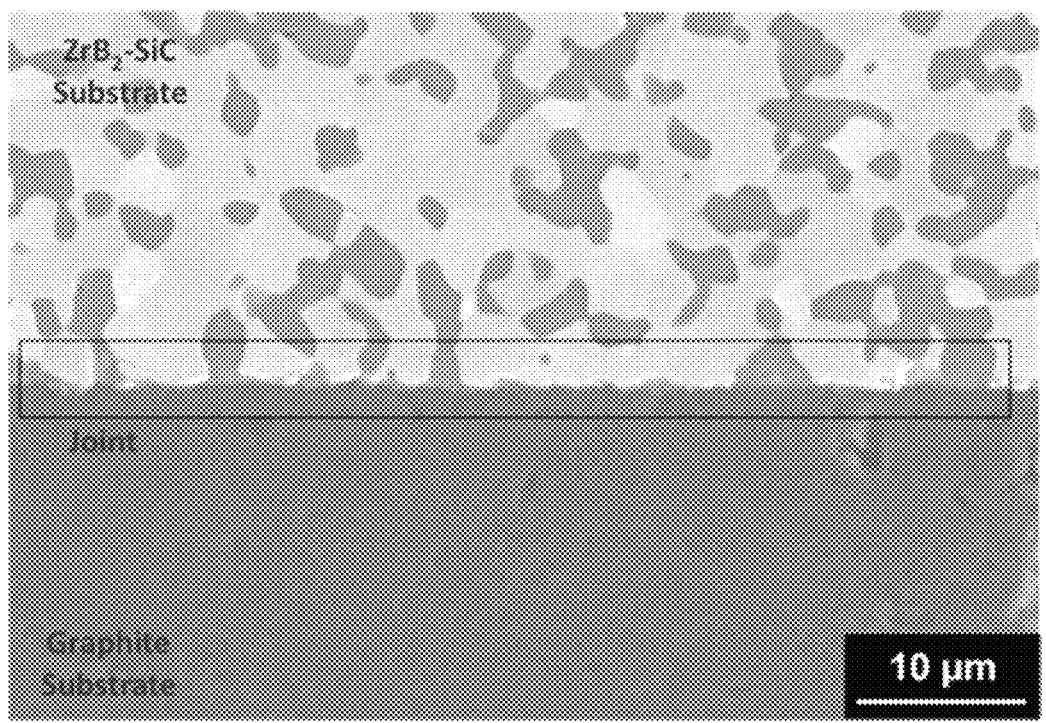
FIG. 5 shows $ZrB_2$—SiC joined with graphite at 1700° C. for 5 minutes.

Discs of ZrB$_2$—SiC and graphite are joined at substrate temperatures of 1700° C. using less than 1,500 Amps, and held for five minutes under an applied pressure of 2 MPa, The results are shown in FIG. 5, where the transition interphase is less than 1,000 nm in thickness, and composed of ZrC, BC, ZrSi (based on the constituent substrate composition)

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

What is claimed is:

1. A method of producing a composite material, the method comprising joining two or more units of baseline material at a joint interface, wherein joining comprises rapid heating by passing a direct current through and/or around the joint and maintaining the temperature for a period of time sufficient to join the units, wherein the baseline material of each unit is the same or different, and wherein the baseline material is selected from the group consisting of: a ceramic, a ceramic composite, a metal composite, and a carbon material, provided that the composite material does not comprise two or more units of a metal composite, wherein one or both of the following is true;
   (a) the joining is performed in a spark plasma sintering furnace; and/or
   (b) the method further comprises rapid cooling of the joined units at rate of about 50° C./minute to about 200° C./minute.

2. A method according to claim 1, comprising joining two or more units of baseline material at a joint interface using a filler material, and wherein the two or more units of the baseline material are the same and are selected from the group consisting of: a ceramic, a ceramic composite, and a carbon material.

3. A method according to claim 2, wherein the filler is the same as the baseline material to be joined or a component of the baseline material to be joined.

4. The method of claim 2 wherein the joint interface has a porosity of up to 75%.

5. The method according to claim 1, wherein each baseline material is an Ultra High Temperature Ceramic or an Ultra High Temperature Ceramic composite.

6. The method according to claim 5, wherein each baseline material is selected from the group consisting of ZrB$_2$, HfB$_2$, TaB$_2$, TiB$_2$, NbB$_2$, TiC, ZrC, NbC, HfC, and TaC.

7. The method according to claim 6, wherein the baseline material further forms ceramic composites with SiC, B$_4$C, or TaSi$_2$.

8. A method according to claim 1, wherein the two or more units are different baseline materials, wherein the method further comprises joining the two units using a filler material that is identical to at least one of the baseline materials or is a component of at least one of the baseline materials to be joined.

9. The method of claim 8 wherein the joint interface has a porosity of up to 75%.

10. The method according to claim 1, wherein the baseline material of each unit is different, and wherein the joining two or more units of baseline material at a joint interface comprises joining the two or more units of baseline material at a transition interphase.

11. The method according to claim 10, wherein the transition interphase is less than 1 μm thick.

12. The method of claim 1, wherein the joining is performed in a spark plasma sintering furnace.

13. The method of claim 12, wherein the method further comprises rapid cooling of the joined units at rate of about 50° C./minute to about 200° C./minute.

14. A method according to claim 1, wherein the baseline material is selected from the group consisting of: a ceramic, a ceramic composite, and a carbon material.

15. The method according to claim 1, wherein each baseline material is selected from the group consisting of boride-, carbide-, nitride-, and oxide-based ceramics.

16. The method according to claim 1, wherein the baseline material of each unit is the same, and wherein the joining two or more units of baseline material at a joint interface comprises joining the two or more units of baseline material at a homogenous interface.

17. The method of claim 1, wherein the method does not comprise use of a filler material.

18. The method of claim 1, wherein the total direct current is from about 800 amps to about 30,000 amps.

19. The method of claim 1, wherein the rapid heating is at a rate of about 50° C./minute to about 200° C./minute.

20. The method of claim 1 wherein the temperature is maintained for 60 minutes or less.

21. The method of claim 1, wherein the temperature maintained for joining is from about 800° C. to about 2000° C.

22. The method of claim 1, wherein the temperature maintained for joining is from about 1500° C. to about 2000° C.

23. The method of claim 1, wherein the method further comprises rapid cooling of the joined units at rate of about 50° C./minute to about 200° C./minute.

* * * * *